Patented May 7, 1940

2,199,475

UNITED STATES PATENT OFFICE 2,199,475

PROCESS OF PRODUCING A CARBON MONOXIDE-HYDROGEN MIXTURE

William D. Wilcox, Kansas City, Mo.

No Drawing. Application July 15, 1937,
Serial No. 153,722

3 Claims. (Cl. 23—212)

In my U. S. Patent No. 1,903,845, I disclose procedures for converting hydrocarbon gases or vapors of any known composition into a mixture of carbon monoxide and hydrogen in the volumetric ratio of one and two suitable for use in the synthesis of methanol. In one of these procedures hydrocarbon gases and steam in a controlled proportion are passed through a refractory walled conduit filled with refractory heat absorbing masses which have been brought to a temperature in excess of 2000° F. by a prior internal combustion of fuel gas. Where methane is dissociated by heat in admixture with steam, according to the equation $CH_4$ plus $H_2O$ equals CO plus $3H_2$, there is an excess of hydrogen above the desired one to two ratio. There is an excess of hydrogen even where the gases treated contain two or more atoms of carbon in the molecule. I secure the desired proportion of carbon monoxide to hydrogen by adding to the gas along with the steam a controlled volume of carbon dioxide. If the gas to be dissociated be a pure methane I employ some excess of steam above the theoretical requirements of two volumes to three of gas and add one volume of $CO_2$. The resulting reactions may be indicated by the equations

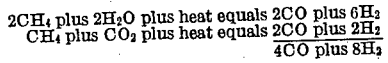

30 Where the gas contains some ethane or higher homologs of methane a somewhat less proportion of $CO_2$ will be required. As an alternative procedure disclosed in this patent, hydrocarbon gases are partially dissociated in admixture with steam and a volume of oxygen added, preferably at an intermediate point in the travel of the gas steam mixture through the heated dissociation chamber after a considerable dissociation of the gas and steam has taken place. The oxygen unites with the carbon of the undecomposed hydrocarbon gas, according to the equation $2CH_4$ plus $O_2$ equals 2CO plus $4H_2$. Any oxygen not required to effect this oxidation unites with hydrogen to form water vapor, burning out the excess of hydrogen. There is generated a very considerable heat which added to that absorbed by the gas from contact with the heated refractories creates a temperature much in excess of that which can be imparted by external means and insures a complete dissociation of the hydrocarbon gas. This complete dissociation is of the greatest importance where the product gas is to be used in the synthesis of methanol. Assuming a pure methane to be treated, a volume ume of methane. It is not possible to heat hydrocarbon gases by passage through externally heated metal pipes to a temperature at which a really complete dissociation can be secured. But a dissociation up to 80 or 90% may be brought about by this means, and in my U. S. Patent #1,905,326 I disclose a mixture of hydrocarbon gas and steam partially dissociated by passage through a series of pipes set in an enclosing furnace. This mixture of partially dissociated gas and steam is then passed into a refractory walled combustion chamber and sufficient oxygen is introduced to complete the oxidation of the carbon in the as yet undecomposed hydrocarbon gas and to burn to water vapor any excess of hydrogen above twice the volume of CO. Where the initial dissociation was 80% the heat generated in this partial combustion will bring the mixture to a temperature in excess of 3000° F. There is an advantage in the use of the procedure disclosed in #1,905,326 rather than that described in #1,903,845, in that the process is continuous, requiring no periodic shifting of valves and in an avoidance of the possibility of nitrogen contamination, which may take place in the operation of #1,903,845, unless great care is taken in purging the interior of the dissociation chamber at the end of each reheating cycle. If purging is not complete, the product gas will be contaminated with nitrogen and some $CO_2$ from the gases of combustion. The great handicap in economical production by the process described in #1,905,326 is the cost of obtaining oxygen by the fractioning of air. Even where the oxygen is produced continuously on a large scale the cost per 1000 cubic feet greatly exceeds that of natural gas or of $CO_2$ obtained by absorption from combustion gases.

The improvement which I have discovered to be possible consists in adding to the gas steam mixture prior to its introduction into the dissociating chamber, a controlled volume of $CO_2$. This reduces the amount of oxygen necessary to control the ratio of carbon monoxide to hydrogen. Only so much oxygen need be used as will by the combustion which it supports bring up the final temperature of the treated gas to a point at which a complete dissociation of the hydrocarbon gas is assured. I also find it of advantage to limit the volume of steam added to very little more than is absolutely necessary to effect the degree of initial dissociation desired. While this improvement in procedure may be carried out in the form of plant disclosed in my U. S. Patent #1,903,845, it is best adapted to employment as a modification of the process disclosed in my U. S. Patent #1,905,326.

By way of example, assuming the hydrocarbon gas to be a pure methane, I pass into the externally heated alloy steel pipes 5 volumes of $CH_4$, 4 volumes of steam and 1 volume of $CO_2$. The reactions which are effected in the passage of the gas through the pipes may be indicated by the following equations—

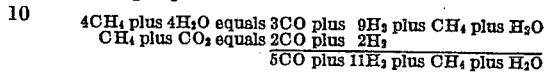

The mixture is now passed into the combustion chamber at a temperature of 1800° F. or higher. It is not an absolute necessity that this temperature should be exact. Where a catalyst is employed to accelerate dissociation the degree of dissociation required may be obtained at a somewhat lower temperature, but in this event a larger addition of oxygen may be required to insure a complete dissociation of the hydrocarbon gas. To the mixture of gases shown above there is added 1 volume only of oxygen, ½ cubic foot of $O_2$ unites with each cubic foot of undecomposed methane, according to the equation

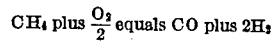

½ cubic foot of oxygen burns to water vapor the excess cubic foot of hydrogen. The final product is $6CO$ plus $12H_2$ plus $2H_2O$. Each cubic foot of CO formed generates 36.1 B. t. u. net. Each cubic foot of hydrogen burned generates 274.2 B. t. u. net. The addition of heat due to the partial combustion, assuming the heat capacity of CO to be .30 at the temperature attained, and that of the other gases to correspond, will be 665° F., which if the gas steam was at an entering temperature of over 1800° F., assures a final temperature at the conclusion of the reactions which take place in the combustion chamber, of well over 2400° F. This should be adequate to assure a complete dissociation of the hydrocarbon gases. Where gases richer than methane are treated a lesser addition of $CO_2$ is required. Where in treating methane by my original procedure with oxygen, one half cubic foot of oxygen was required to obtain 3 cubic feet of product gas, by the modified procedure just described, it becomes possible to obtain 18 cubic feet of product gas, using 1 cubic foot of $CO_2$ and 1 cubic foot of oxygen. Equally assured results are secured with a much less expense in the way of controlling gases.

I do not limit myself in the carrying out of the procedure described to any particular proportion of $CO_2$ or of oxygen addition or to any precise degree of initial dissociation. I will in general employ such proportions of steam, $CO_2$ and oxygen, as under the special conditions existing at the place of operation, and having in mind the respective costs of gas, $CO_2$ and oxygen are found to yield a product in which the CO and hydrogen are in the proportions desired and which will be free from any material percent of undecomposed hydrocarbon gas. Where sufficient oxygen is employed in connection with a rather complete initial dissociation the final temperature of the product gas will be above 3000° F. The sensible heat of the product gas may be utilized in effecting a part of the initial dissociation, being passed in countercurrent travel in contact with a portion of the externally heated conduit in which the mixture of hydrocarbon gas, steam and carbon dioxide is subjected to pyrolysis. It will not be possible to effect the initial dissociation without some use of fuel gas as the source of heat but the total volume required can be greatly reduced by utilizing the sensible heat in the final product by heat exchange.

What I claim as new and desire to protect by the issuance to me of Letters Patent is—

1. The improvement in the process of obtaining a mixture of carbon monoxide and hydrogen in controlled proportions by adding to the product of a partial dissociation of the hydrocarbon gas in admixture with steam a sufficient volume of oxygen to oxidize to carbon monoxide the carbon of any undecomposed hydrocarbon gas in the mixture, and to burn to water vapor any hydrogen in excess of the proportion relative to carbon monoxide desired, which consists in reducing the volume of oxygen required by adding to the hydrocarbon gas steam mixture prior to heating it, a proportion of carbon dioxide.

2. The process of obtaining a mixture of carbon monoxide and hydrogen in controlled proportions by the dissociation of hydrocarbon gases, which consists in subjecting a mixture of hydrocarbon gas, steam and carbon dioxide gas in controlled proportions to a dissociating temperature, effecting a partial dissociation, and thereafter adding to the product gas in a refractory walled combustion chamber oxygen in a volume adequate to oxidize to carbon monoxide the carbon in any undecomposed hydrocarbon gas, to burn to water vapor any excess of hydrogen in the gas and to create by the partial combustion such a rise in the temperature of the gas as will assure the complete dissociation of the hydrocarbon gas.

3. The process of obtaining a mixture of carbon monoxide and hydrogen in controlled proportions by the dissociation of hydrocarbon gases, which comprises passing a mixture of hydrocarbon gas, steam and carbon dioxide gas in controlled proportions through a conduit heated to a temperature in excess of 1800° F. and thereby effecting a partial dissociation of the several gases, then passing the product gas into a refractory walled combustion chamber and adding to it a volume of oxygen adequate to oxidize to carbon monoxide the carbon of any undecomposed hydrocarbon gas, to burn to water vapor any excess of hydrogen above the proportion desired and to create by the generation of heat a temperature such as assures a substantially complete dissociation of the hydrocarbon gas.

WILLIAM D. WILCOX.